United States Patent [19]
Bardey et al.

[11] Patent Number: 5,339,622
[45] Date of Patent: Aug. 23, 1994

[54] GAS TURBINE ENGINE WITH IMPROVED WATER INGESTION PREVENTION

[75] Inventors: Xavier M. H. Bardey, Chartrettes; Michel A. A. Desaulty, Vert Saint Denis; Jérome E. R. Jolu, Pringy; Serge M. Meunier, Le Chatelet en Brie; Pierre C. Mouton, Grigny; Sylvie Poutonnet, Limeil Brevannes; Jacques Renvier, Nogent, all of France

[73] Assignee: Societe Nationale D'Etude et de Construction de Moteurs D'Aviation (S.N.E.C.M.A.), Paris, France

[21] Appl. No.: 107,175

[22] Filed: Aug. 17, 1993

[30] Foreign Application Priority Data

Aug. 19, 1992 [FR] France .................. 92 10124

[51] Int. Cl.⁵ .............................................. F02G 3/00
[52] U.S. Cl. ...................... 60/39.092; 60/751; 415/169.2; 55/306
[58] Field of Search ............ 60/39.091, 39.092, 751; 415/169.1, 169.2; 244/538; 55/306

[56] References Cited

U.S. PATENT DOCUMENTS

| | | |
|---|---|---|
| 3,436,910 | 4/1969 | Haworth . |
| 3,877,221 | 4/1975 | Lefebvre et al. . |
| 3,879,939 | 4/1975 | Markowski . |
| 4,255,174 | 3/1981 | Simpson . |
| 4,389,227 | 6/1983 | Hobbs . |
| 4,458,479 | 7/1984 | Reider et al. ............ 60/751 |
| 5,044,153 | 9/1991 | Mouton . |
| 5,123,240 | 6/1992 | Frost et al. . |

FOREIGN PATENT DOCUMENTS

| | | |
|---|---|---|
| 706904 | 1/1968 | Belgium . |
| 8800235 | 4/1988 | Fed. Rep. of Germany . |
| 640104 | 7/1950 | United Kingdom . |

*Primary Examiner*—Richard A. Bertsch
*Assistant Examiner*—William Wicker
*Attorney, Agent, or Firm*—Bacon & Thomas

[57] ABSTRACT

A gas turbine engine is disclosed having an air compressor and a generally annular combustion chamber, with a generally annular diffuser located between the compressor and the combustion chamber so as to direct air exiting from the compressor toward the combustion chamber. The diffuser has inner and outer walls and defines an exit which is located adjacent to an opening in an upstream wall portion of the combustion forming a dome cowl. The dome cowl divides the air emanating from the diffuser exit into a primary air stream passing through the opening and one or more secondary air streams which pass between the walls defining the combustion chamber and the walls of a casing enclosing the combustion chamber assembly. A guide is associated with the diffuser for directing water in the air passing through the diffuser away from the opening such that it will not pass directly into the combustion chamber. Guide vanes may be located on an external surface of the dome cowl so as to direct the water in the secondary air-flow such that it does not enter openings defined by the outer combustion chamber wall, thereby preventing the water from entering the combustion chamber.

6 Claims, 3 Drawing Sheets

GAS TURBINE ENGINE WITH IMPROVED WATER INGESTION PREVENTION

BACKGROUND OF THE INVENTION

The present invention relates to the field of gas turbine engines, more particularly such gas turbine engines having devices for preventing the ingestion of water into the combustion chamber.

Gas turbine engines, particularly turbojet engines used to power aircraft, typically comprise an axial air compressor; a generally annular diffuser located downstream of the air compressor and bounded by an outer wall and an inner wall, the diffuser receiving compressed air from the compressor and directing it towards a combustion chamber; a generally annular combustion chamber in which the compressed air is mixed with pressurized fuel and ignited; and an axial turbine located downstream of the combustion chamber which drives the air compressor upon being rotated by the exhaust gases from the combustion chamber. As is well known in the art, the air passes in an upstream to downstream direction by sequentially passing through the compressor, the diffuser, the combustion chamber and the turbine.

Such turbojet engines with axial geometry at their front intakes not only receive the air required for operation, but also, depending upon climatic conditions, may also ingest sand and/or water which will deleteriously affect their operation. This is particularly true when an aircraft passes through a storm, or a large cloud such as a cumulus or a cumulo-nimbus cloud. In these events, large amounts of water may enter the engine compressor. If the engine is operating at full power, the water will vaporize and, even if it were to enter the combustion chamber, would be atomized sufficiently so as to not extinguish the ignition within the chamber which, under these conditions, is being supplied with fuel at a high rate.

However, when the aircraft is operating under low power conditions, such as descending during a landing approach, liquid water, in the form of large drops or even sheets of water may pass into the engine and be ingested into the combustion chamber. Under these conditions, this amount of water may extinguish the combustion at one or more of the burners, since the fuel supply is at a comparatively low rate. Ignitors, which are located downstream of the fuel injectors, may also be wetted by the water and become temporarily inoperative. Unless the pilot can direct the aircraft out of the atmospheric conditions, the engine may be stopped completely.

To avoid such potentially catastrophic situations, it is mandatory to reduce the quantities of water entering the combustion chamber, or, at the very least, prevent the moist air from extinguishing the burners and wetting the ignitors.

Various solutions have been proposed to reduce the amount of water in a turbojet engine air flow. U.S. Pat. No. 4,389,227 describes a system for collecting a flow of water on a nose cowl and to split it into droplets. Because of their weight, the droplets are evacuated into the cold flow bypass duct, thereby precluding their intake into the combustion chamber.

U.S. Pat. No. 4,255,174 describes a separator to remove liquid droplets from a gas flow. The guide vanes define a plurality of channels spaced along the entire length of their leading edges, which channels combine at the top of the assembly at their trailing edges. The centrifuged droplets are expelled toward the radially outer zones of a primary air duct.

U.S. Pat. No. 5,044,153 describes a turbojet engine wherein water entering the engine is removed by discharge scoops located immediately downstream of the low pressure compressor.

In these systems, the partial elimination of the water taken by the turbojet engine is carried out in the airflow far upstream of the combustion chamber. Because of the swirling air motion within the engine, a peripheral film of hot air is enriched with upstream water. This peripheral film is especially water enriched at the diffuser exit opposite the fuel injector air intakes. Because of their high density, the water drops of the peripheral film are moved toward the injectors into the combustion chamber, where the ignition may be extinguished and the ignitors may be wetted.

SUMMARY OF THE INVENTION

A gas turbine engine is disclosed having an air compressor and a generally annular combustion chamber, with a generally annular diffuser located between the compressor and the combustion chamber so as to direct air exiting from the compressor toward the combustion chamber. The diffuser has inner and outer walls and defines an exit which is located adjacent to an opening in an upstream wall portion of the combustion forming a dome cowl. The dome cowl divides the air emanating from the diffuser exit into a primary air stream passing through the opening and one or more secondary air streams which pass between the walls defining the combustion chamber and the walls of a casing enclosing the combustion chamber assembly. A guide is associated with the diffuser for directing water in the air passing through the diffuser away from the opening such that it will not pass directly into the combustion chamber.

Guide vanes may be located on an external surface of the dome cowl so as to direct the water in the secondary air-flow such that it does not enter openings defined by the outer combustion chamber wall, thereby preventing the water from entering the combustion chamber.

The dome cowl partially encloses the fuel injector which extends through an upstream end wall of the combustion chamber. The secondary air-flow may pass over both the radially outer and radially inner sides of the wall defining the combustion chamber.

The guide associated with the diffuser may comprise a groove defined by an internal surface of the outer wall of the diffuser and may further include a plurality of channels defined by the internal surface of the outer wall which communicate with the groove. The guide vanes located on the dome cowl of the combustion chamber may have a generally "V"-shaped configuration in which the apex of the "V" faces toward the diffuser exit.

The guide may also comprise a plurality of vents defined by the outer wall of the diffuser, which vents may be selectively and remotely closed, depending upon operating conditions of the engine.

The principles according to this invention may also be incorporated into existing turbojet engines by a guide means which comprises a wedge member mounted in the diffuser opposite the opening defined by the dome cowl. The wedge member has a generally "V"-shaped configuration and is oriented with the apex of the "V" facing toward the compressor.

DETAILED DESCRIPTION OF THE PREFERRED EMBODIMENTS

Figure 1:
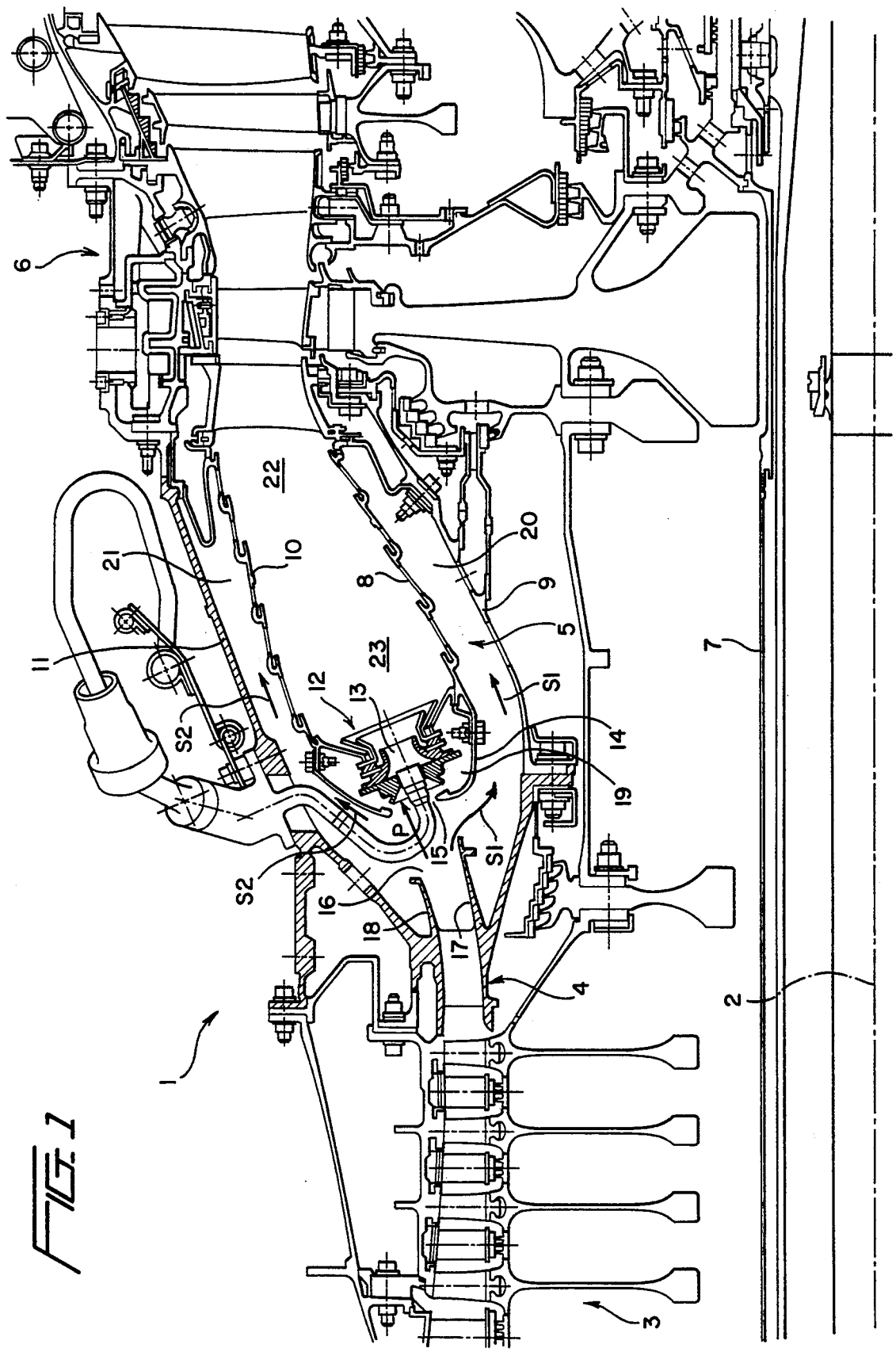
FIG. 1 is a partial, longitudinal, cross-sectional view of an aircraft turbojet engine including the water ingestion prevention device according to the present invention.

FIG. 1 illustrates an axial-flow turbojet engine 1 having a central longitudinal axis 2 and comprising, as viewed from upstream to downstream, an air compressor 3, a diffuser 4, a generally annular combustion chamber 5 and a turbine 6 which drives the compressor 3 via shaft 7. The annular combustion chamber 5 comprises an inner wall 8 spaced from an inner casing wall 9 and an outer wall 10 spaced from outer casing wall 11. The combustion chamber further comprises a plurality of bowls 12 surrounding a plurality of fuel injectors 13 which extend through an upstream wall of the combustion chamber. Dome cowl 14 partially encloses fuel injectors 13 and defines an opening 15 located opposite the exit 16 of the diffuser 4. The diffuser 4 is bounded by inner diffuser wall 17 and outer diffuser wall 18 which are concentric about longitudinal axis 2. The diffuser is supplied with compressed air issuing from the compressor 3 and guides the air toward the dome cowl 14 of the combustion chamber 5.

The dome cowl 14 splits the air emanating from the diffuser 4 into a primary air-flow P which passes through apertures 15 into stabilizing chambers 19 located within the dome cowl 14, and also into two annular secondary air-flows S1 and S2. The first secondary air-flow S1 circulates in the annular space 20 bounded by inner casing wall 9 and inner wall 8 of the combustion chamber 5. The second secondary air flow S2 circulates in the annular space 21 bounded by the outer casing wall 11 and the outer wall 10 of the combustion chamber 5. Secondary flows S1 and S2 cool the walls 8 and 10 of the combustion chamber, in known fashion, and, also in known fashion, take part in the combustion of the gases within the combustion chamber, as well as controlling the temperature profile of the combustion chamber outlet. Air in the secondary flows S1 and S2 may enter the primary combustion zone 23, as well as dilution zone 22, through orifices formed in the walls 8 and 10, in known fashion. The primary air P is mixed with fuel provided by the fuel injectors 13 in the primary combustion zone 23 of the combustion chamber.

With this known structure of a turbojet engine, any water drops in the peripheral film of the air-flow leaving the diffuser 4 will pass through opening 15 and enter the stabilizing chamber 19. The present invention provides means to guide the water in a peripheral film in the diffuser 4 away from the opening 15 in order to avoid extinguishing the combustion within the combustion chamber 5 and so as to order to avoid the wetting of the ignitors (not shown) downstream of the injectors 13.

Figure 2:
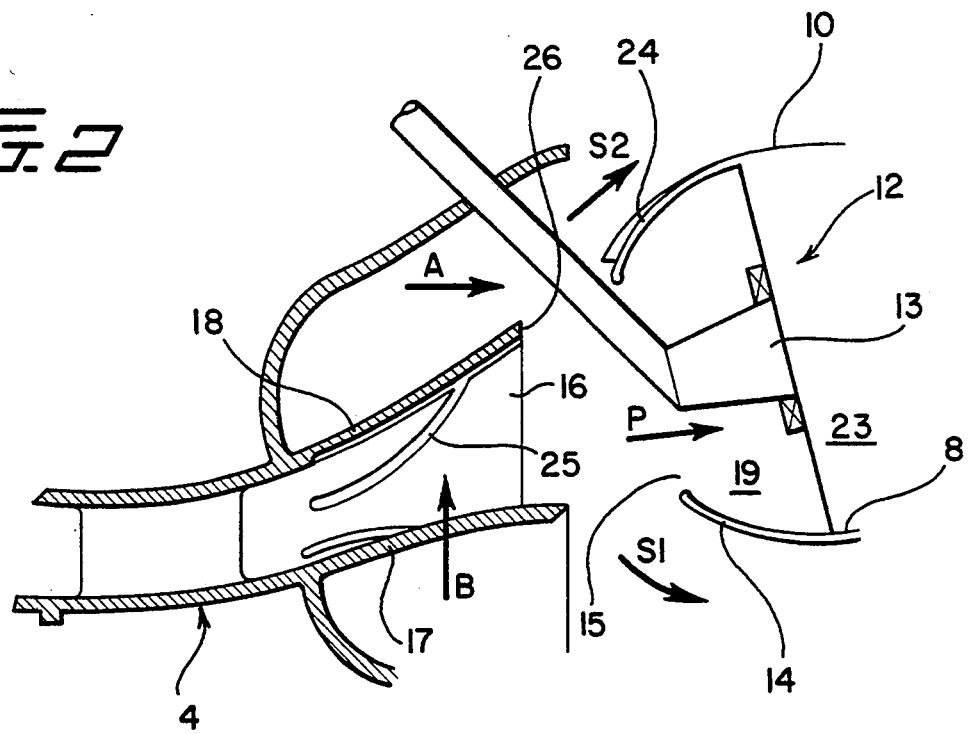
FIG. 2 is an enlarged, cross-sectional view of the turbojet engine of FIG. 1 illustrating a first embodiment of the device according to the present invention.
Figure 3:
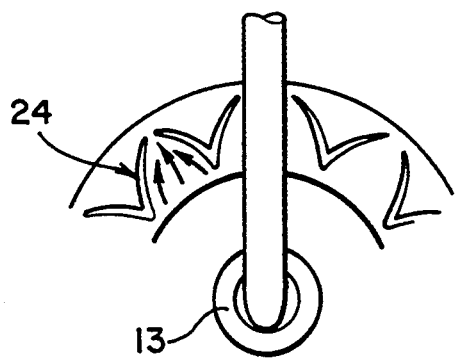
FIG. 3 is a front view of the combustion chamber of the turbojet engine of FIG. 1 taken in the direction of arrow A in FIG. 2.
Figure 4:
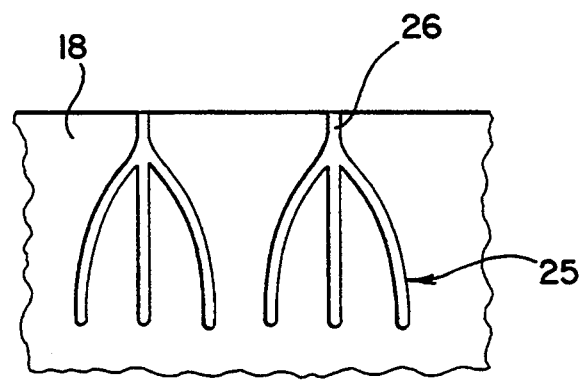
FIG. 4 is a radial view of the outer wall of the diffuser viewed in the direction of arrow B in FIG. 2.

As illustrated in FIGS. 2–4, an array of guide vanes 24 are located on an external surface of the dome cowl 14 in order to guide the peripheral film toward predetermined zones of the combustion chamber so as to avoid openings through wall 10 which provide primary air or dilution air to the combustion chamber. The guide vanes 24, which have a generally "V"-shaped configuration, as best seen in FIG. 3, may be formed separately and attached to the external surface of the dome cowl 14, or they may be formed by corrugating the walls of the dome cowl 14. In either case, the apex of the "V" faces toward the diffuser, as illustrated in FIG. 3.

The internal surface of the outer diffuser wall 18 defines a plurality of grooves 26 which extend generally longitudinally into the diffuser from the diffuser exit 16. The internal surface of the outer wall 18 also defines a plurality of channels 25 which collect the water drops of the peripheral film passing through the diffuser and guides the drops toward the grooves 26.

Figure 5:
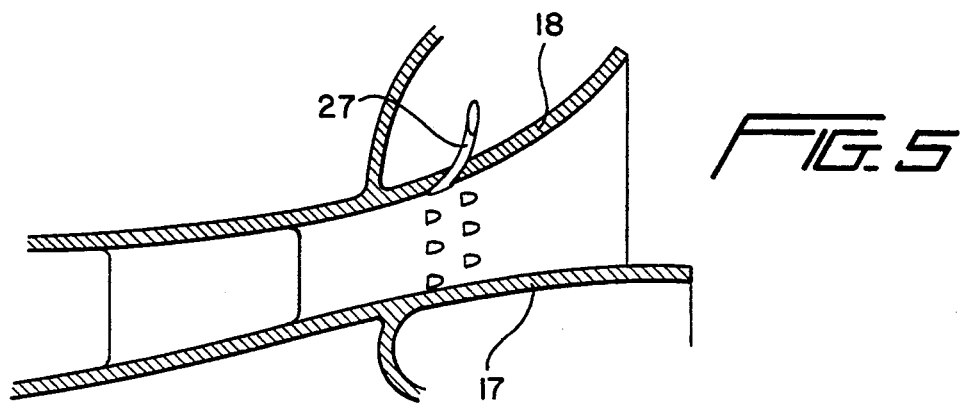
FIG. 5 is an enlarged, cross-sectional view of a second embodiment of the diffuser incorporating the water ingestion prevention device according to the present invention.

As illustrated in FIG. 5, vents 27 may also be provided through the outer wall 18 of the diffuser 4 in order to at least partially collect the water from the peripheral film and to guide it toward the secondary air flow S2. The vents may be remotely closable so that they may be operative only at desired times during the engine operating cycle.

Figure 6:
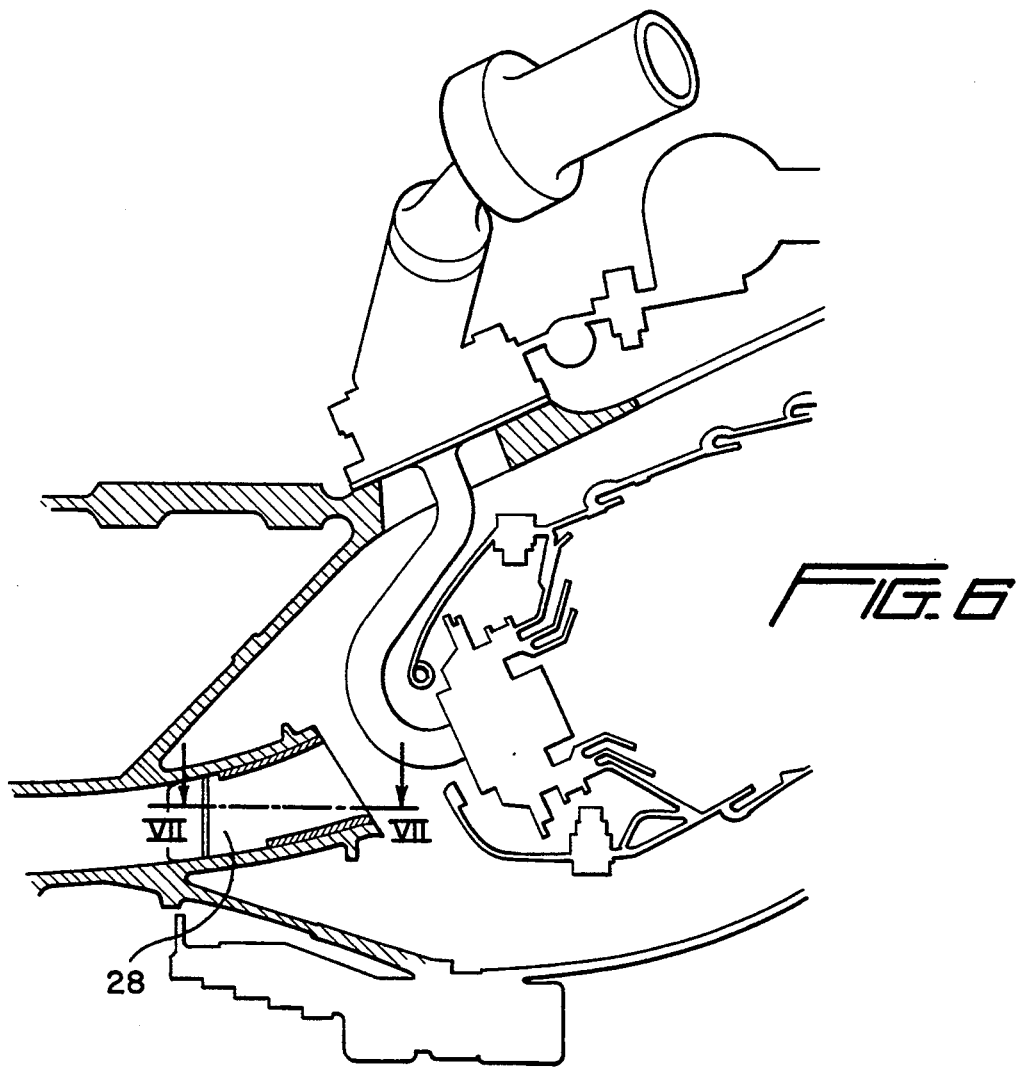
FIG. 6 is a partial, longitudinal cross-sectional view of a turbojet engine illustrating a third embodiment of the water ingestion prevention device according to the present invention.
Figure 7:
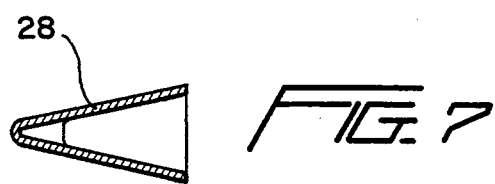
FIG. 7 is an enlarged, cross-sectional view taken along line VII—VII in FIG. 6.

FIGS. 6 and 7 illustrate an alternative embodiment of the guide means to keep the water drops away from the injectors 13. In this embodiment, the guide means comprises one or more wedge members 28 inserted into the diffuser 4 adjacent the diffuser exit 16 and extending between the inner diffuser wall 17 and the outer diffuser wall 18. The wedge members 28 have a generally "V"-shaped configuration and are oriented such that the apex of the "V" faces upstream, towards the compressor. As the air flow passes over the wedge members 28, the air returns to pass through the opening 15, but the water, by virtue of its greater inertia, does not change direction and is therefore excluded from the opening 15. This embodiment may be retro-fitted into existing turbojet engine structures.

The foregoing description is provided for illustrative purposes only and should not be construed as in any way limiting this invention, the scope of which is defined solely by the appended claims.

We claim:

1. A gas turbine engine having an air compressor and a generally annular combustion chamber, comprising:
   a) a generally annular diffuser located between the air compressor and the combustion chamber so as to direct air exiting from the compressor toward the combustion chamber, the diffuser having inner and outer walls and defining an exit;
   b) a dome cowl portion of the combustion chamber located adjacent to the exit of the generally annular diffuser, the dome cowl portion defining an opening and located so as to divide the air emanating from the diffuser exit into a primary air stream passing through the opening and at least one secondary air stream; and, c) guide means located in the diffuser for guiding water in the air passing through the diffuser away from the opening defined by the dome cowl portion of the combustion chamber wherein the guide means comprises at least one groove defined by an internal surface of the outer wall of the diffuser, the at least one groove extending into the diffuser from the diffuser exit.

2. The gas turbine engine of claim 1 further comprising a plurality of channels defined by the internal surface of the outer wall communicating with a groove.

3. The gas turbine engine of claim 2 wherein the plurality of channels are defined by corrugations in the outer wall.

4. The gas turbine engine of claim 1 further comprising at least one guide vane located on an external surface of the dome cowl portion.

5. The gas turbine engine of claim 4 wherein the at least one guide van has a generally "V"-shaped configuration in which the apex of the "V" faces toward the diffuser.

6. The gas turbine engine of claim 4 wherein the guide vanes are formed by corrugations of the dome cowl portion.

* * * * *